April 14, 1970  D. V. CHENOWETH  3,506,379
DIFFERENTIAL PRESSURE LIQUID LEVEL CONTROL APPARATUS
Filed Sept. 19, 1968  4 Sheets-Sheet 1
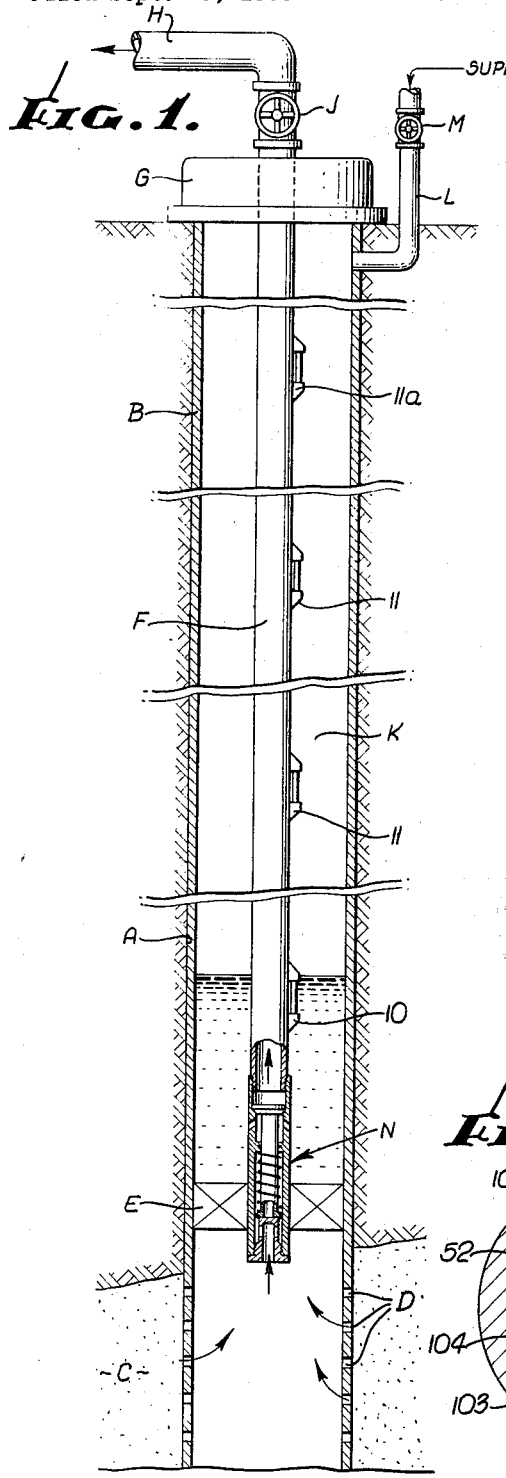
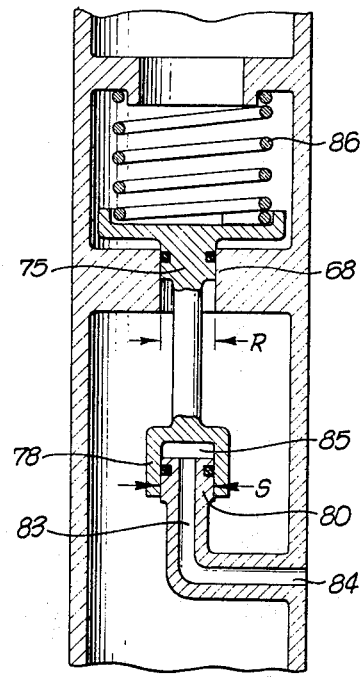
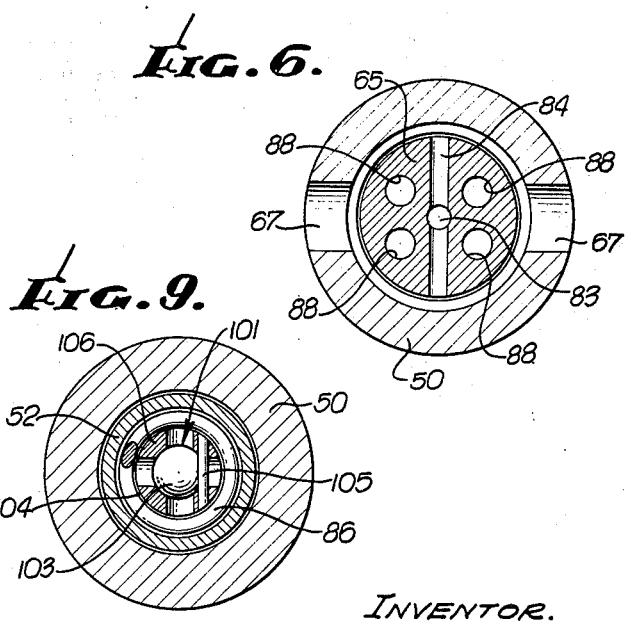
INVENTOR.
DAVID V. CHENOWETH
BY Bernard Kriegel
ATTORNEY.

April 14, 1970

D. V. CHENOWETH 3,506,379

DIFFERENTIAL PRESSURE LIQUID LEVEL CONTROL APPARATUS

Filed Sept. 19, 1968

INVENTOR.
DAVID V. CHENOWETH
By Bernard Kriegel
ATTORNEY.

April 14, 1970 D. V. CHENOWETH 3,506,379
DIFFERENTIAL PRESSURE LIQUID LEVEL CONTROL APPARATUS
Filed Sept. 19, 1968 4 Sheets-Sheet 3

INVENTOR.
DAVID V. CHENOWETH
By Bernard Kriegel
ATTORNEY.

April 14, 1970 D. V. CHENOWETH 3,506,379
DIFFERENTIAL PRESSURE LIQUID LEVEL CONTROL APPARATUS
Filed Sept. 19, 1968 4 Sheets-Sheet 4
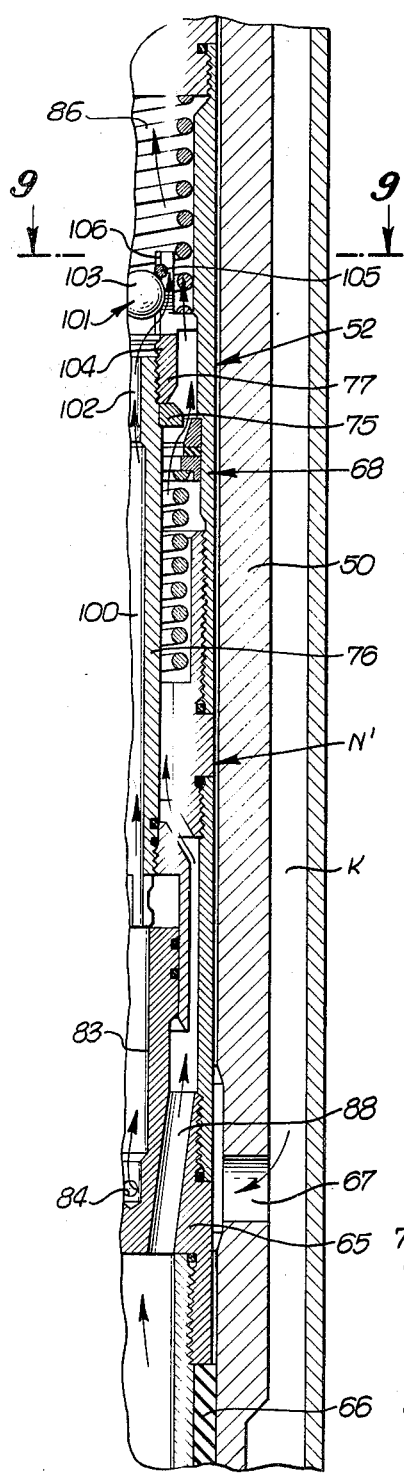
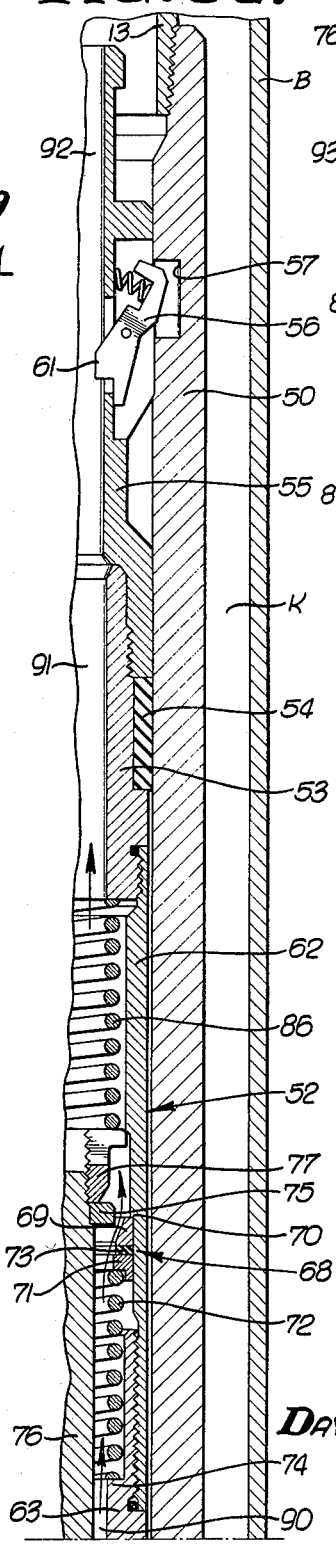
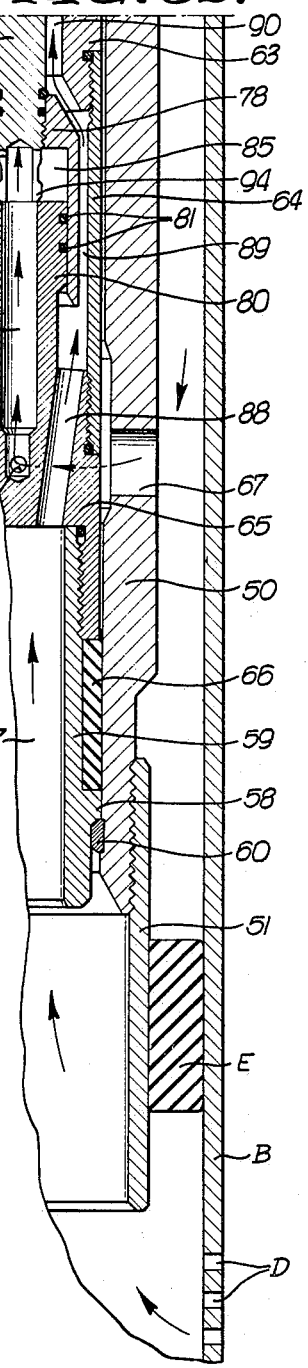
INVENTOR.
DAVID V. CHENOWETH
By Bernard Kriegel
ATTORNEY.

@# United States Patent Office 3,506,379
Patented Apr. 14, 1970

3,506,379
DIFFERENTIAL PRESSURE LIQUID LEVEL CONTROL APPARATUS
David V. Chenoweth, Houston, Tex., assignor to Baker Oil Tools, Inc., City of Commerce, Calif., a corporation of California
Filed Sept. 19, 1968, Ser. No. 760,883
Int. Cl. F04f *1/00*
U.S. Cl. 417—116                    26 Claims

ABSTRACT OF THE DISCLOSURE

Level of the formation liquid in a well bore tubing string is controlled by causing gas pressure in the casing to exert an opening force on a subsurface differential valve, the pressure in the tubing string exerting a closing force on the valve aided by a spring. The valve is balanced with respect to the pressure of the formation fluid tending to enter the tubing string through the valve, so that formation pressure has no effect on opening and closing of the valve.

---

The present invention relates to apparatus for controlling the liquid level in a tubing string, and more particularly to the control of the formation fluid level in a string of production tubing disposed in a well bore, this apparatus usually being adapted for use in conjunction with a gas-lift valve that will elevate the fluid column in the tubing string to the top of the well bore.

A conventional gas-lift system operates by aerating the tubing fluid column with supply gas to reduce the bottom hole pressure sufficiently to induce production from the producing zone. This is done by injecting casing supply gas into the tubing fluid column through a series of carefully spaced preset gas-lift valves installed along the tubing string. These valves are used to sequentially unload the fluids, such as well fluids, drilling mud, or the like, from the casing-tubing annulus down to the desired point of gas injection, employing the normally available supply gas pressure, which is fed into the annulus at the top of the well bore. This usually requires a packer to be run and set in the casing for the purpose of isolating the formation from the annulus.

After the upper unloading or gas-lift valves have accomplished the unloading phase of the fluids in the annulus they remain closed, the bottom gas-lift valve being operative to secure elevation of the tubing fluid column to the top of the well bore under the driving force of the gas supply pressure in the tubing-casing annulus. This gas pressure may be insufficient to raise a production fluid column completely filling the tubing string, so that it is desirable for the plurality of gas-lift valves to be employed for the purpose of partially unloading the tubing fluid column to reduce its hydrostatic head sufficiently, whereupon the bottommost unloading valve can then take over the function of supplying gas, as needed, into the tubing string for the purpose of elevating the fluid column. The bottommost valve operates either continuously or intermittently, depending upon well conditions. The unloading of the tubing fluid column became necessary whenever the tubing string is shut in, before the normally available gas supply pressure operating through the lower gas-lift valve can begin performing its function of elevating the shorter column of fluid in the tubing string to the top of the well bore.

It has been proposed to provide a liquid level control device which will determine the level of the liquid in the tubing string after the tubing string has been initially unloaded, so that it is unnecessary to subsequently unload the tubing fluid column in the event the well is shut down or shut in; that is to say, a single gas-lift valve can aerate or lift the liquid column in the annulus without the necessity for sequentially unloading a full column of tubing fluid. Such a control device is illustrated in U.S. Patent No. 2,599,713. Prior control devices, however, have been relatively complex and costly to manufacture. In addition, they have the added disadvantage of being unable to control the rise of liquid in the tubing string to a predetermined level because of their being subjected to variations in pressure of the formation fluid.

By virtue of the present invention, a differential control valve is provided capable of accurately determining the elevation to which the formation fluid can rise in the tubing string. This valve provides a favorable differential between the casing gas pressure and the pressure in the tubing under both shut-down and shut-in conditions of the well, making it unnecessary to unload a tubing fluid column with the normally available gas supply at each subsequent start-up of the apparatus. The formation pressure has no effect on opening and closing of the differential control valve, which is shiftable to an open position by the casing-tubing annulus gas pressure and which is shifted toward a closed position by the pressure within the tubing string thereabove plus the force exerted by some supplemental mechanism, such as a spring, which has a preset value. The valve parts are so proportioned and arranged that the areas over which the formation pressure can act are equal or balanced, enabling the differential in pressure between the casing annulus and the tubing to act over certain areas of the valve and overcome the preset spring force, effecting opening of the valve to admit production to the tubing string when the pressure differential exceeds the spring force, the spring shifting the valve to the closed position to prevent entry of production fluid into the tubing string when the casing to tubing pressure differential decreases below a certain value. The differential control valve snaps to its open condition, and also snaps to its closed condition, eliminating throttling during fluid flow therethrough, as well as during the gas lifting phase of the operation of the apparatus, thereby minimizing damage to the control valve. The differential control valve holds the casing to tubing differential pressure to a minimum desirable condition, permitting restarting through use of a single gas-lift valve thereabove to be accomplished. The differential control valve can reopen during gas lifting to allow additional formation fluid to enter the tubing string when the tubing pressure drops below the setting of the control valve.

The differential control valve can assume several forms, constituting a permanent installation in the tubing string, or being of the type that can be lowered into the tubing string and removed therefrom on a wire line whenever desired.

This invention possesses many other advantages, and has other purposes which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURE 1 is a diagrammatic view of a gas-lift well installation, which includes the differential pressure liquid level control apparatus;

Figure 4A:
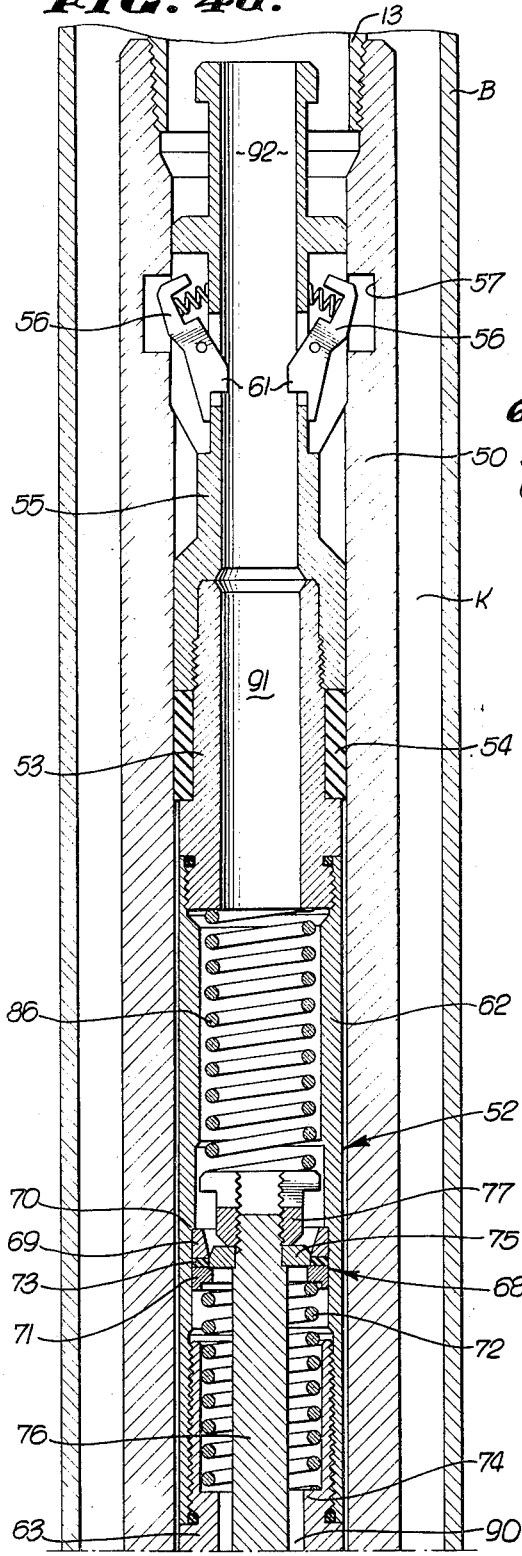
Figure 4B:
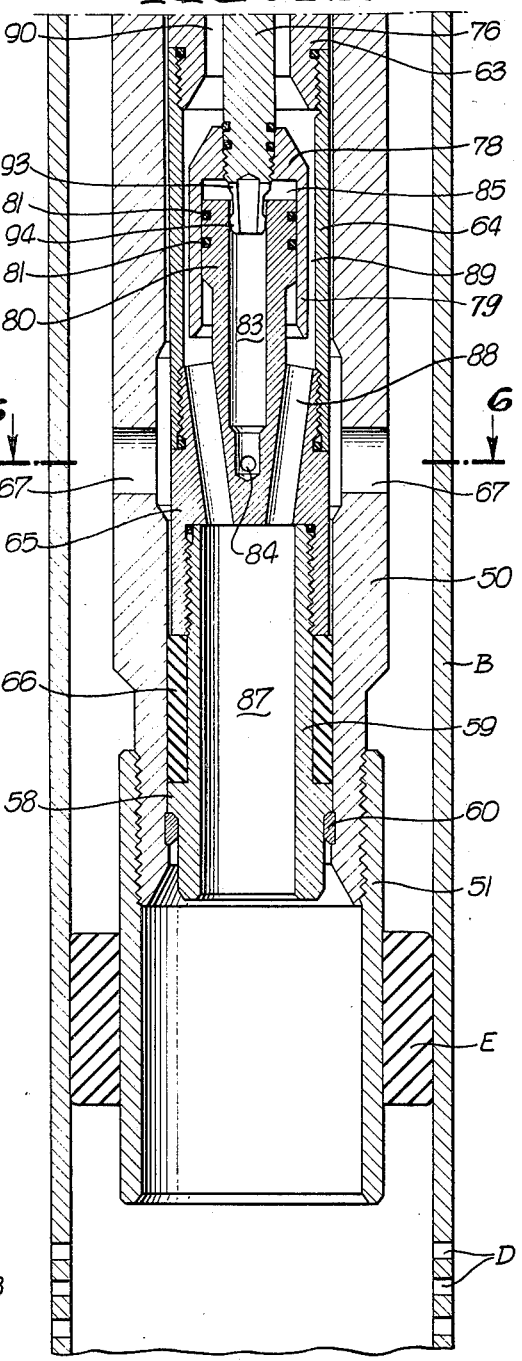

FIGS. 4a and 4b together constitute a longitudinal section through another form of differential pressure control apparatus in closed condition, FIG. 4b being a lower continuation of FIG. 4a;

FIGS. 5a and 5b together are a partial longitudinal section similar to FIGS. 4a and 4b, with the apparatus in open condition, FIG. 5b being a lower continuation of FIG. 5a;

FIG. 6 is a cross-section taken along the line 6—6 on FIG. 4b;

FIG. 7 is a schematic diagram of the differential valve control apparatus shown in FIGS. 4a to 6, inclusive;

FIG. 8 is a partial longitudinal section through still another embodiment of the invention; and FIG. 9 is a section taken along the line 9—9 on FIG. 8.

A system embodying the differential control valves illustrative of the present invention is disclosed in FIG. 1, which diagrammatically represents an oil well A having a casing string B therein, with fluid from a production zone C capable of passing through casing perforations D to the casing interior. A well packer E is set in the casing string above the perforations, and a tubing string F is disposed in leak-proof relation to the packer, so that formation fluid can flow upwardly through the tubing string to the top of the well bore, the tubing string extending in sealed relation through a casing head G and into a production line H under the control of a surface valve J.

A lowermost gas-lift valve 10 is mounted on the tubing string to control the injection of gas within the casing-tubing annulus K which is supplied from a suitable compressor or supply line through the gas line L into the upper portion of the casing string, there being a suitable valve M for controlling such flow of gas. A series of spaced preset gas lift valves 11 are also installed along the tubing string F at predetermined intervals, these gas-lift valves above the uppermost valve 11a normally being used only for initially unloading the liquid in the tubing string, and also in the casing-tubing annulus K down to the lowermost gas-lift valve 10, so that this latter valve can, thereafter, intermittently or continuously aerate the liquid column in the tubing string F and raise it to the top of the well bore and into the production line H. After the initial lowering of the liquid level in the tubing string to the desired value, the gas-lift valves 11 above the lowermost valve will close, the lowermost valve 10 being the only one necessary for continuously or intermittently unloading the fluid column of production fluid, inasmuch as a differential control valve N will prevent the liquid level or pressure in the tubing string F from rising to a point at which the liquid cannot be discharged from the tubing string by the supply gas in the casing-tubing annulus K.

Figure 2:
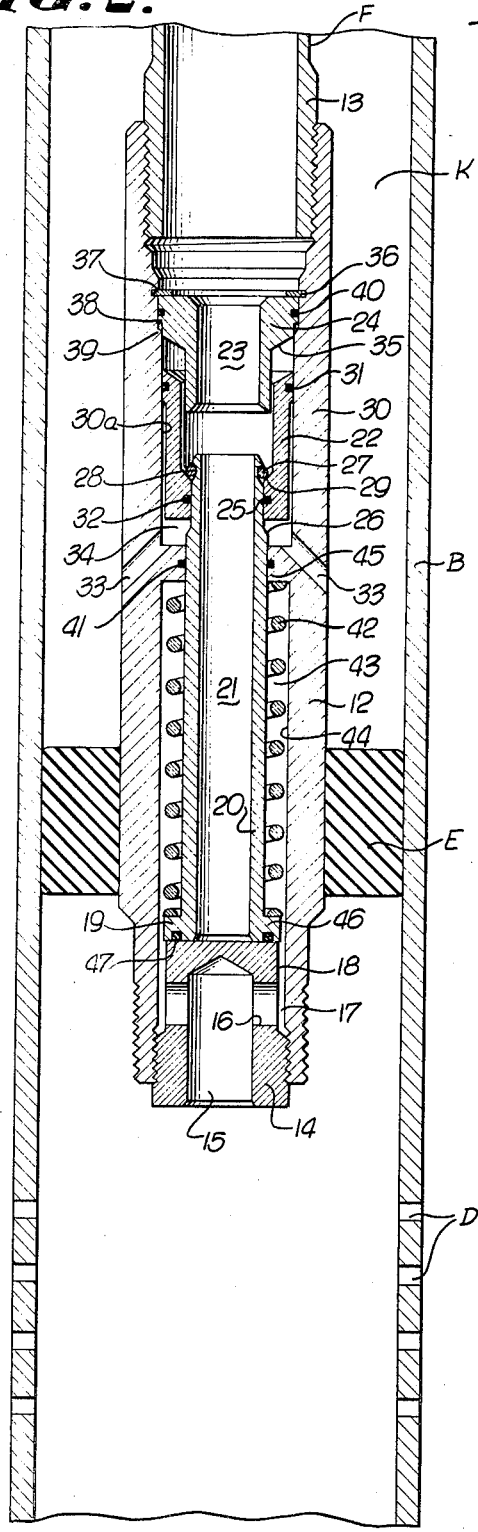
FIG. 2 is a longitudinal section through the control apparatus when in closed condition.
Figure 3:
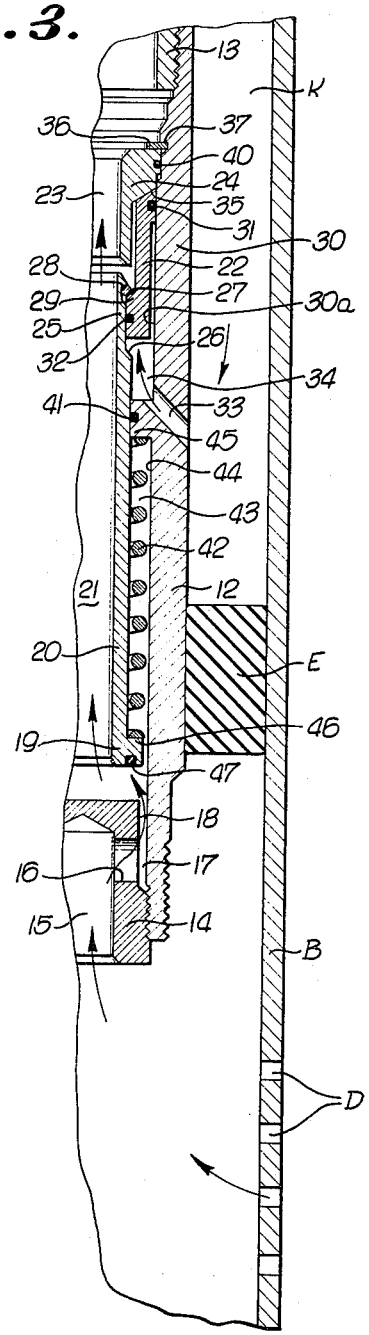
FIG. 3 is a partial longitudinal section similar to FIG. 2, with the control apparatus in open condition.

In the form of invention disclosed in FIGS. 2 and 3, the differential control valve forms a permanent part of the tubing string F. It includes an outer housing or tubular member 12 adapted to be disposed within and in sealed relation to the well packer E, this packer being disclosed only diagrammatically in the drawings, since it can assume any well-known form. Preferably, the well packer is of the type that will remain anchored against the action of the formation pressure tending to release it from the casing B and move it upwardly therein. The upper portion of the housing 12 is threadedly secured to the lower end of a lowermost tubing section 13 constituting part of the tubing string F extending to the top of the well bore. Disposed within the lower portion of the housing is a valve seat member 14 threaded thereinto and having a central passage 15 into which the formation fluid can flow, passing through ports 16 into an annular space 17 surrounding the upper portion 18 of the valve seat member which is of a smaller diameter than the internal diameter of the housing 12. Upward flow of the formation fluid in the housing is controlled by the engagement or disengagement of a valve head 19 provided on the lower end of a piston rod 20 having a central passage 21 therethrough. Elevation of the piston rod 20 will remove the valve head 19 from its seat 14 and allow the formation fluid to flow upwardly through the production passage 21 in the rod and through an upper piston 22 secured to the rod into a passage 23 in a stop and protector sleeve 24 in the upper portion of the housing, from where the fluid will flow into the tubing string F. The piston 22 is hollow and encompasses the upper reduced diameter portion 25 of the rod, its downward movement relative to the rod being prevented by its engagement with a shoulder 26 on the rod, its upward movement being limited and prevented by a suitable retaining ring 27 mounted in a rod groove 28 and overlying an upwardly facing piston shoulder 29. The piston 22 is slidable longitudinally in a cylinder portion 30 in the upper end of the housing, there being a suitable piston seal ring 31 slidably sealing against the wall of the cylinder, leakage of fluid between the piston 22 and its rod 20 being prevented by a suitable seal ring 32 in the piston engaging the periphery of the rod.

The gas under pressure in the casing-tubing annulus K above the packer E can act upon the piston 22 and tend to elevate the piston and the rod, to effect raising of the valve head 19 from its companion seat. This gas can flow through one or more side ports 33 in the housing into an annular cylinder space 34 provided between the rod 20 and the cylinder wall 30a, acting upon the transverse downwardly facing areas of the piston and tending to elevate it in the cylinder, limited by engagement of the upper end of the piston with the downwardly facing shoulder 35 of the stop sleeve 24, this stop sleeve being retained in position by a split retaining ring 36 disposed in a housing groove 37 and overlying the upper end of the sleeve 24. Downward movement of the stop sleeve is prevented by engagement of a downwardly facing shoulder 38 with a companion upwardly facing stop shoulder 39 in the housing 12. Leakage of fluid between the sleeve and housing is prevented by a suitable side seal ring 40 on the sleeve engaging the housing wall. The gas pressure is prevented from moving upwardly out of the cylinder space 34 by the external and internal piston seals 31, 32. It is also prevented from leaving this space by a rod seal 41 mounted in the housing and slidably and sealingly engaging the periphery of the piston rod 20.

The gas under pressure in the annulus K is acting in an upward direction on the piston 22, tending to raise it and its rod, in order to elevate the valve head 19 from its seat 14 against the force of a helical compression spring 42 disposed in an annular space 43 between the rod 20 and an internal housing wall 44 in its lower portion. The upper end of this spring 42 seats against an inwardly directed flange 45 of the housing containing the rod seal ring 41, and its lower end engages an external flange 46 on the piston rod at its head portion 19, this external flange also carrying a seal ring 47 in its end face adapted to engage and seal against the transverse upper face 48 of the valve seat member 14. The formation fluid in the annulus 17 between the seat 14 and the housing 12 can enter the spring space 43 and can pass upwardly to the piston rod seal 41. The seal diameter of this latter seal 41 against the rod 20 and the seal diameter of the valve head seal member 47 are preferably equal to one another, so that the formation fluid under pressure is acting over equal and opposite areas of the piston rod 20 and will not tend to exert a force either elevating or lowering the piston rod. In other words, the valve rod 20 is balanced with respect to formation fluid.

The pressure within the tubing string F is acting in a downward direction over the piston 22, and also over the upper end area of the piston rod 20. However, it is also acting in an upward direction over the end area of the valve head 19 of the rod between the seal diameter of the valve seal ring 47 and the internal diameter of the production passage 21 of the piston rod. Effectively, the fluid pressure in the tubing string F is acting downwardly over the annular area of the piston 22 between the seal diameter of the upper piston seal ring 31 and the seal diameter of the lower seal ring 47, and this annular area is the same as the annular area over which the lifting gas under pressure is acting in an upward direction on the piston 22. The gas under pressure in the cylinder 34 is exerting an upward force over the annular area of the piston 22, tending to lift the piston and rod 20; whereas, the pressure in the tubing string F is exerting a downward force on the piston over its annular area, which is supplemented by the downward force exerted by the valve closing spring 42. When the force on the piston exerted by the pressure of the lifting gas, which is always at a higher unit pressure than the pressure in the tubing string F, exceeds the downward force of the fluid pressure in the tubing string F plus the force of the spring 42, the piston 22 and piston rod 20 are elevated to remove the valve head 19 from its seat 14, allowing the formation fluid to flow through the valve and its production passage 21 and upwardly into the tubing string F.

The formation fluid or liquid will flow upwardly through the valve until the level of liquid in the tubing string F reaches a predetermined point or height, or the pressure in the tubing string reaches a predetermined value, at which time the pressure of the fluid or liquid column acting downwardly on the piston 22 plus the force of the spring 42 will be sufficient to overcome the upward force of the lifting gas on the piston 22, the valve then shifting to a closed position. When this occurs, the gas-lift valve 10 in the tubing string immediately above the differential control valve N opens to allow the gas under pressure to enter the tubing string F for the purpose of elevating the column of liquid in the tubing string to the top of the well bore. As the liquid column in the tubing string is dumped at the top of the well bore, the pressure in the tubing string F may decrease to the point at which the differential control valve N will again reopen, allowing additional formation liquid to flow through the differential control valve and into the tubing string. When the pressure in the tubing string drops to the point at which the gas-lift valve 10 closes, the differential control valve will have reopened to permit additional formation fluid to pass through the valve and into the tubing string.

The apparatus in the well bore, depending upon well conditions and the gas pressure available in the casing-tubing annulus K, may operate so that the gas-lift valve 10 remains open so as to continuously lift the production to the top of the well bore, in which event the differential control valve N will remain open. The apparatus and well conditions may be such that the gas-lift valve 10 operates only intermittently, which usually occurs when the rate of flow of the formation fluid into the well is relatively low. Under this latter condition, the gas-lift valve 10 will remain closed until the differential control valve N has allowed the formation fluid to rise in the tubing string F to a predetermined level, at which it automatically opens the gas-lift valve 10 to allow gas under pressure to enter the tubing string and lift the slug of formation fluid through the tubing string F to the top of the well bore. Inasmuch as the differential control valve N limits the level to which the formation fluid can rise in the tubing string, assurance is had that the pressure of the gas in the casing is sufficiently high as to elevate the production fluid to the top of the well bore, without the necessity for using the upper gas-lift valves 11 for unloading the tubing string. Similarly, in the event that the well is shut in for any period of time, the differential control valve N will prevent the liquid in the tubing string F from rising above a predetermined point, assuring that the normally available gas supply pressure is sufficient to elevate the column of liquid in the tubing string to the top of the well bore, without the necessity for first unloading the tubing string. The differential control valve N is so proportioned and arranged that the height of liquid column in the tubing string is less than the formation pressure, insuring that the formation fluid can flow through the differential control valve and into the tubing string.

The static friction of the upper piston ring seal 31 against the wall 30a of the cylinder 30, and the static friction of the rod seal 41 against the periphery of the piston rod 20 are such that the valve will remain closed until the gas-lift pressure significantly exceeds the combined downward forces exerted on the piston and rod by the pressure in the tubing string F and by the helical compression spring 42. The gas pressure not only must overcome such forces, but also the static friction forces of the seal rings 31, 41 against their opposed surfaces. Once the force of the lifting gas is also sufficient to overcome the friction forces, the piston 22 and its rod 20 snap upwardly to a full valve opening condition (FIG. 3), since the sliding friction of the seals 31, 41 against their companion surfaces is much less than the static friction. Similarly, the valve will snap from its fully opened condition to its closed condition when the downward force exerted by the spring 42 and the tubing pressure exceeds the off-setting force of static friction of the seals 31, 41 against their companion surface and the lift gas in the cylinder 34. Once such force is exerted, the piston 22 and rod 20 are shifted downwardly suddenly, since the sliding friction of the seal rings against their companion surfaces is substantially less than their static friction force against such surfaces. Accordingly, the valve either occupies an open or a closed condition, and will not remain in a partially opened condition, such as would produce a relatively small passage between the valve head 19 and its companion seat 14, and a consequent throttling action during upward flow of the formation fluid through the valve and into the tubing string F. The elimination of the throttling action minimizes erosive wear and other damage to the differential control valve N.

Another embodiment of differential control valve N is illustrated in FIGS. 4a to 7, which can be run in the tubing string F on a wire line and removed therefrom whenever desired. With this particular control valve, a seating nipple or tubular member 50 forms a lower portion of the tubing string F, its upper end being threadedly secured to an adjacent tubing section 13, its lower end being threadedly secured to a tubular seal member 51 adapted to seal within the central bore or passage through the well packer E set in the well casing above the formation casing perforation D. The differential control valve illustrated includes an outer housing 52 consisting of an upper mandrel section 53 carrying a suitable upper seal unit 54, this upper mandrel section being secured to a lock mandrel 55 carrying pivoted lock dogs 56 adapted to snap outwardly into a locking groove 57 in the upper portion of the seating nipple. The downward movement of the housing 52 within the seating nipple 50 is limited by engagement of a shoulder 58 on a lower mandrel section 59 of the housing 52 with a stop ring 60 secured to the lower portion of the seating nipple 50. When the shoulder 58 is so engaged with the stop ring 60, the lock dogs 56 are opposite the groove 57 and can be snapped thereinto to prevent inadvertent upward movement of the housing 52 until the dogs 56 are purposely released, as determined by engagement of the portion of a retrieving tool (not shown) with the inwardly directed noses 61 of the dogs. The lock assembly per se forms no part of the present invention. Its construction and mode of operation can be determined by reference to U.S. Patent No. 2,885,007.

The housing 52 further includes an upper intermediate section 62 threadedly secured to the upper mandrel section 53, the lower end of which is threadedly secured to a connector or coupling 63 which, in turn, is threadedly attached to a lower intermediate housing section 64 threadedly attached to a cross-over sub 65, which is threadedly secured to the lower mandrel section 59. A lower seal unit 66 is mounted on the lower section, this seal unit being longitudinally spaced from the upper seal unit 54 by a distance that will locate the lower seal unit 66 below side ports 67 in the lower portion of the seating nipple or tubular member 50, with the upper seal unit 54 slidably sealing against the wall of the seating nipple above such ports. The gas pressure in the casing-tubing annulus K is adapted to move along the exterior of the housing 52 between the seals 54, 66, but is prevented from moving upwardly and downwardly therebeyond.

Mounted within the housing 52 is a valve seat 68, consisting of an upper ring 69 engaging a downwardly facing housing shoulder 70, a lower ring 71 engaging the upper end of a helical compression spring 72, and a seal ring 73 held between the upper and lower rings 69, 71. The parts of the valve seat 68 are retained in appropriate relation by the helical spring 72, the lower end of which engages a spring seat 74 provided by an upwardly facing shoulder of the connector or coupling 63.

A companion valve head 75 is mounted on a valve rod 76, being clamped thereto by a clamp nut 77, this valve head having its periphery adapted to fit within the cylindrical inner surface of the valve seat 68 and in engagement with its seal 73, in which event the valve is in a closed position. The lower end of the valve stem 76 is threaded into the upper end of a cylinder 78 having a depending cylinder skirt 79 encompassing and slidably sealing against an annular piston 80 integral with and extending upwardly from the cross-over sub 65. This piston has one or a plurality of piston rings 81 slidably sealing against the inner wall of the depending cylinder sleeve or skirt 79. The cross-over sub 65 has a central passage 83 communicating with side ports 84 (FIG. 6) opening to the exterior of the sub, which ports 84 are in communication with the ports 67 of the tubular member 50, so that gas pressure can enter the central passage 83 and move into an upper cylinder space 85 provided between the cylinder head 78 and the piston 80 and tending to shift the cylinder 78, valve rod 76, and valve head 75 in an upward position out of engagement with the companion seat 68 and against the force of a helical compression spring 86, the lower end of which bears against the upper end of the nut 77 and the upper end of which bears against the lower end of the upper mandrel section 53.

The formation fluid flows into the tubular member 51 extending through the well packer E and into the central flow passage 87 in the lower mandrel section 59, then flowing upwardly through a plurality of circumferentially spaced longitudinal passages 88 in the cross-over sub into the annular space 89 between the cylinder skirt 79 and the housing section 64, and also through the annular space 90 between the valve rod 76 and the connector 63, from where the formation fluid can flow through the valve seat 68, when the valve head 75 is elevated from the seat, into the upper housing section 62, then continuing upwardly through the passage 91 in the upper mandrel section 53 and through the passage 92 of the lock assembly 55 into the tubing string F thereabove. The seal diameter of the seal rings 81 on the piston engaging the inner wall of the cylinder sleeve 79 is preferably equal to the seal diameter of the valve seat seal 73 against the valve head 75, so that the valve is pressure balanced with respect to the formation fluid pressure, which is incapable of exerting any force either tending to shift the valve to an open condition or a closed condition.

The spring 72 retaining the valve seat 68 against its shoulder 70 has the function of permitting fluid to be pumped downwardly through the valve apparatus, the seat 68 being shifted downwardly along the housing section 62 and out of engagement with the valve head 75. However, the spring 72 normally holding the valve seat 68 in its upper position exerts a greater force than the spring 86 exerting a downward force on the valve head 75 and operating rod 76, so that the latter spring cannot shift the valve seat downwardly, downward shifting of the valve seat 68, as described above, only occurring upon applying sufficient pressure to the fluid in the tubing string F above the seat.

With the valve in closed position (FIGS. 4a, 4b), the gas under pressure in the casing is acting through the ports 67, 84 and the cross-over piston passage 83 within the cylinder space 85 above the piston 80, acting upon the entire seal area of the cylinder 78 in an upward direction to tend to urge the rod 76 and valve head 75 upwardly from engagement with the seat 68, or to an open condition. Such upward valve opening force is being exerted against the combined force of the upper spring 86 and the pressure of the fluid in the tubing string F, and it must overcome such combined force before the valve will open (FIGS. 5a, 5b). The valve will snap to its open condition because of the friction of the piston seal rings 81 against the cylinder, and also of the valve head seal 73 against the valve head 75, shifting suddenly to an open condition. They will tend to be retained in such open condition, since the lower end of the rod 76 is formed as a collet having spring-like arms 93 and fingers 94 thereon that will be disposed above the upper end of the piston 80 and shift laterally to a slight extent thereacross (FIG. 5b). When the liquid level in the tubing string F rises to the point at which the pressure in the tubing string combined with the force of the spring 86 overcomes the gas pressure acting in an upward direction on the cylinder 78 and rod 76, as well as the resisting force afforded by the collet 93, 94, the collet fingers 94 will be forced laterally inwardly and the valve will snap downwardly to a shut position at which the valve head 75 is disposed in sealing engagement with the valve seat seal 73. Thus, the valve either snaps to the open condition or to the shut condition, and will not remain in an intermediate position that could result in a throttling action on the formation liquid flowing between the valve head 75 and seat 68, which would introduce erosive wear between these parts.

The forces acting on the valve to shift it between open and closed conditions are illustrated diagrammatically in FIG. 7, in which the valve head 75 is sealed within its companion seat 68 over a seal area R, the cylinder 78 surrounding the upper portion of the piston 80 being sealed thereagainst over the area S, these two areas preferably being equal. The formation fluid can flow upwardly in the apparatus and around the cylinder 78 and to the valve seat 68. The gas pressure can flow through the ports 84 to the central passage 83 for action in an upward direction over the cylinder head, or over the seal area of the cylinder 78. The pressure of the fluid in the tubing string F above the valve is acting in a downward direction on the valve head 75 over its seal area, and this pressure is supplemented by the force of the spring 86. By making the seal areas of the valve head 75 and the cylinder 78 equal, formation fluid pressure has no effect in shifting the valve to opened or closed positions. When the gas pressure exceeds the combination of the tubing pressure and the unit pressure equivalent of the spring 86, the valve will be snapped to the open condition. When the tubing pressure and unit pressure equivalent of the spring exceed the formation pressure, the valve will snap to its closed condition.

The differential control valve specifically illustrated in FIGS. 4a to 7 is used in conjunction with the gas-lift valves 10, 11 disclosed in FIG. 1. Essentially, it operates in the same manner as the first embodiment of the invention specifically described above. When desired, it can be retrieved by running a suitable retrieving tool (not shown) on a wire line down through the tubing string F to retract the latches 56 and become coupled to the lock mandrel 55 of the lock assembly, whereupon the valve housing 52 can be elevated from the seating nipple or tubular member 50 and through the tubing string F to the top of the well bore.

In the form of invention disclosed in FIG. 8, a combination differential control valve and gas-lift valve $N^1$ is provided for continuous flow of production and its gas lifting to the top of the well bore. This valve can be used without the necessity for incorporating a separate gas-lift valve in the tubing string F, such as the lowermost gas-lift valve 10 disclosed in FIG. 1.

Essentially, the differential control valve for limiting the height to which the formation fluid could rise in the tubing string under a shut-in condition is the same as in FIGS. 4a to 7. However, the gas under pressure, which determines the open and closed conditions of the differential control valve, is permitted to flow through a central passage 100 in the valve rod and past a check valve 101 into the upper portion of the housing 52 and lock assembly 55 and thence into the tubing string F. The upper portion 102 of the rod passage 100 is of reduced diameter to provide a choke for purpose of throttling the gas, so that the gas pressure for aerating and lifting the production to the top of the well bore is less than the gas pressure in the casing-tubing annulus K. The back check valve 101 specifically illustrated is in the form of a ball valve element 103 adapted to seat downwardly against a companion seat 104 on the downstream side of the choke 102, in order to prevent back flow of the fluid in the tubing string into the casing-tubing annulus. Upward movement of the check valve element from its seat is limited by its engagement with a restraining rod 105 extending across the upper passage 106 through the nut 77 clamping the valve head 75 to the rod 76.

Normally, the combined differential control valve and gas-lift choke are operating with the valve in an open condition, the production flowing into the well bore being sufficient for a continuous lifting by the gas to the top of the well bore. However, should the gas supply decrease, or should it be desired to shut the well in, the differential control valve will operate to limit the level to which the liquid level can rise in the tubing string F, closing when such level is reached. Accordingly, subsequent restarting can occur by merely injecting gas under pressure into the casing and without the necessity for first unloading a full or substantially full tubing string.

I claim:

1. In apparatus for controlling flow of fluid in a tubular string adapted to be disposed in a well bore having a producing formation: a tubular member connectible in the tubular string and having a passage through which production fluid from the formation can flow upwardly into the tubular string; valve means in said passage for controlling flow of production fluid therethrough, said valve means including first fluid pressure actuatable means responsive to the pressure of actuating fluid in the well bore externally of the tubular string for exerting a force tending to shift said valve means to open position, said valve means further including second fluid pressure actuatable means responsive to the pressure of fluid in the tubular string for exerting a force tending to shift said valve means to closed position when the fluid level of production fluid in the tubular string rises to a predetermined height, said valve means further including third means supplementing the force of said second fluid pressure actuatable means tending to shift said valve means to closed position.

2. In apparatus as defined in claim 1; said valve means having all upwardly and downwardly facing transverse areas subject to the pressure of the production fluid substantially entirely equal to each other whereby said valve means is substantially entirely pressure balanced to the pressure of the production fluid.

3. In apparatus for controlling flow of fluid in a tubular string adapted to be disposed in a well bore having a producing formation: a tubular member connectible in the tubular string and having a passage through which production fluid from the formation can flow upwardly into the tubular string; a valve seat in said member; a valve head movable into and from engagement with said seat to close and open said passage; fluid pressure actuated means connected to said valve head; means for conducting actuating fluid under pressure from the well bore externally of the tubular string to said fluid actuated means to move said valve head from engagement with said seat; said fluid actuated means being subject to the pressure of fluid in the tubular string to move said valve head into engagement with said seat; and supplemental means acting on said valve head to move said valve head into engagement with said seat.

4. In apparatus as defined in claim 3; wherein said supplemental means comprises a spring.

5. In apparatus as defined in claim 3; wherein said fluid actuated means comprises cylinder means and piston means in said cylinder means, one of said cylinder means and piston means being connected to and movable with said valve head, the other of said cylinder means and piston means being connected to said tubular member, said conducting means communicating with said cylinder means.

6. In apparatus as defined in claim 3; wherein said fluid actuated means comprises cylinder means and piston means in said cylinder means, one of said cylinder means and piston means being connected to and movable with said valve head, the other of said cylinder means and piston means being connected to said tubular member, said conducting means communicating with said cylinder means; said piston means and cylinder means being in slidable sealed relation to each other, the sealing location between said cylinder means and piston means and the sealing location of said head against said seat being subject to the pressure of the production fluid, said locations having substantially the same sealing diameters whereby the production fluid exerts substantially no force tending to shift said valve head relative to said seat.

7. In apparatus as defined in claim 3; wherein said fluid actuated means comprises cylinder means fixed to said tubular member, piston means in said cylinder means and secured to said valve head; said conducting means communicating with said cylinder means to feed said actuating fluid into said cylinder means for action on said piston means to shift said valve head from said seat, said piston means being subject to the pressure of fluid in the tubular string to urge said valve head toward said seat.

8. In apparatus as defined in claim 3; wherein said fluid actuated means comprises cylinder means fixed to said tubular member, piston means in said cylinder means and secured to said valve head; said conducting means communicating with said cylinder means to feed said actuating fluid into said cylinder means for action on said piston means to shift said valve head from said seat, said piston means being subject to the pressure of fluid in the tubular string to urge said valve head toward said seat; said head making a seal against said seat when engaged therewith; means providing a seal between said piston means and tubular member; said seals being of substantially equal diameter and both being subject to the pressure of the production fluid.

9. In apparatus as defined in claim 3; wherein said fluid actuated means comprises cylinder means secured to said valve head; piston means in said cylinder means and fixed to said tubular member; said conducting means communicating with said cylinder means to feed said actuating fluid into said cylinder means for action on said cylinder means to shift said valve head from said seat, said cylinder means being subject to the pressure of fluid in the tubular string to urge said valve head toward said seat.

10. In apparatus as defined in claim 3; wherein said fluid actuated means comprises cylinder means secured to said valve head; piston means in said cylinder means and fixed to said tubular member; said conducting means communicating with said cylinder means to feed said actuating fluid into said cylinder means for action on said cylinder means to shift said valve head from said seat, said cylinder means being subject to the pressure of fluid in the tubular string to urge said valve head toward said seat; the seal diameter of said cylinder means against said piston means and the seal diameter of said head against said seat being substantially equal.

11. In apparatus as defined in claim 3; and means communicating with said conducting means for conducting the actuating fluid into the tubular member for passage into the tubular string thereabove.

12. In apparatus as defined in claim 3; and means communicating with said conducting means for conducting the actuating fluid into the tubular member for passage into the tubular string thereabove; said communicating means including a choke.

13. In apparatus as defined in claim 3; wherein said fluid actuated means comprises cylinder means secured to said valve head; piston means in said cylinder means and fixed to said tubular member; said conducting means communicating with said cylinder means to feed said actuating fluid into said cylinder means for action on said cylinder means to shift said valve head from said seat, said cylinder means being subject to the pressure of fluid in the tubular string to urge said valve head toward said seat; and passageway means in said cylinder means communicating with said conducting means and the tubular string above said tubular member for conducting the actuating fluid to the tubular string.

14. In apparatus as defined in claim 3; wherein said fluid actuated means comprises cylinder means secured to said valve head; piston means in said cylinder means and fixed to said tubular member; said conducting means communicating with said cylinder means to feed said actuating fluid into said cylinder means for action on said cylinder means to shift said valve head from said seat, said cylinder means being subject to the pressure of fluid in the tubular string to urge said valve head toward said seat; passageway means in said cylinder means communicating with said conducting means and the tubular string above said tubular member for conducting the actuating fluid to the tubular string; and a choke in said passageway means.

15. In apparatus for controlling flow of fluid in a tubular string adapted to be disposed in a well bore having a producing formation: a tubular member connectible in the tubular string and having a passage through which production fluid from the formation can flow upwardly into the tubular string; a valve seat in said passage; a valve head movable downwardly into engagement with said seat; a piston rod secured to said head and having a passage through which production fluid can flow to the tubular string thereabove when said head is disengaged from said seat; said tubular member having a cylinder therein; a piston slidable in said cylinder and connected to said rod; said piston being subject to the pressure of fluid in the tubular string thereabove which tends to urge said head toward said seat; means for conducting actuating fluid under pressure from the well bore externally of the tubular string into said cylinder for action on said piston to tend to disengage said head from said seat; and supplemental means tending to force said head toward said seat.

16. In apparatus as defined in claim 15; means providing a slidable seal between said tubular member and rod, said seal being subject to the pressure of the production fluid; the seal diameter of said slidable seal and the seal diameter of said head against said seat being substantially equal.

17. In apparatus as defined in claim 15; wherein said supplemental means comprises a spring surrounding said rod and bearing against said tubular member and valve head.

18. In apparatus for controlling flow of fluid in a tubular string adapted to be disposed in a well bore having a producing formation: a tubular member connectible in the tubular string and having a passage through which production fluid from the formation can flow upwardly into the tubular string; a valve seat normally fixed in said passage; a valve head movable downwardly into engagement with said seat; a piston fixed to said tubular member and having a chamber therein; a cylinder slidable along said piston; a rod secured to said cylinder and valve head; said passage including an annular portion between said tubular member and said rod and cylinder; said rod and cylinder being subject to the pressure of fluid in the tubular string thereabove which tends to urge said head toward said seat; means for conducting actuating fluid under pressure from the well bore externally of the tubular string to said chamber for action on said cylinder to tend to disengage said head from said seat; and supplemental means tending to force said head toward said seat.

19. In apparatus as defined in claim 18; the seal diameter of said head against said seat being substantially equal to the seal diameter between said piston and cylinder.

20. In apparatus as defined in claim 18; wherein said supplemental means comprises spring means acting between said tubular member and rod.

21. In apparatus as defined in claim 18; and yieldable means engaging said seat to retain said seat normally fixed in said passage, said yieldable means permitting said seat to move downwardly from said valve head in response to fluid pressure in the tubular string applied to said seat.

22. In apparatus as defined in claim 18; wherein said supplemental means comprises spring means acting between said tubular member and rod; yieldable means engaging said seat to retain said seat normally fixed in said passage, said yieldable means permitting said seat to move downwardly from said valve head in response to fluid pressure in the tubular string applied to said seat; said yieldable means exerting a greater force on said seat than the force exerted by said spring means on said rod and seat.

23. In apparatus as defined in claim 18; passageway means extending upwardly from said chamber and communicable with the tubular string above said tubular member.

24. In apparatus as defined in claim 18; passageway means extending upwardly from said chamber and communicable with the tubular string above said tubular member; and a choke in said passageway means.

25. In apparatus as defined in claim 1; a nipple forming part of the tubular string; and means releasably securing said tubular member in said nipple; said tubular member having a maximum outside diameter no greater than the inside diameter of the tubular string to permit said tubular member to be elevated from said nipple through the tubular string to the top of the well bore.

26. In apparatus as defined in claim 18; a nipple forming part of the tubular string; and means releasably securing said tubular member in said nipple; said tubular member having a maximum outside diameter no greater than the inside diameter of the tubular string to permit said tubular member to be elevated from said nipple through the tubular string to the top of the well bore.

References Cited
UNITED STATES PATENTS

| | | | |
|---|---|---|---|
| 2,054,916 | 9/1936 | Taylor | 103—234 |
| 2,291,902 | 8/1942 | Kelley | 103—40 |
| 2,368,999 | 2/1945 | O'Leary | 103—232 |
| 2,982,226 | 5/1961 | Peters et al. | 103—232 X |
| 3,408,949 | 11/1968 | Hart | 103—232 X |

DONLEY J. STOCKING, Primary Examiner

W. J. KRAUSS, Assistant Examiner